United States Patent
Burnell et al.

(10) Patent No.: US 12,169,247 B2
(45) Date of Patent: Dec. 17, 2024

(54) UAV AND UAV OPERATOR DETECTOR

(71) Applicant: Metis Aerospace Ltd, Lincoln (GB)

(72) Inventors: Anthony Michael Burnell, Potterhanworth (GB); Lee Carter, Bracebridge Heath (GB); Alexander Cruickshanks, North Hykeham (GB)

(73) Assignee: Metis Aerospace Ltd, Lincoln (GB)

( * ) Notice: Subject to any disclaimer, the term of this patent is extended or adjusted under 35 U.S.C. 154(b) by 323 days.

(21) Appl. No.: 17/913,949

(22) PCT Filed: Mar. 25, 2021

(86) PCT No.: PCT/GB2021/050738
§ 371 (c)(1),
(2) Date: Sep. 23, 2022

(87) PCT Pub. No.: WO2021/191625
PCT Pub. Date: Sep. 30, 2021

(65) Prior Publication Data
US 2023/0131377 A1  Apr. 27, 2023

(30) Foreign Application Priority Data
Mar. 27, 2020 (GB) .................. 2004501

(51) Int. Cl.
*G01S 5/04* (2006.01)
*G01S 5/02* (2010.01)
*H01Q 1/28* (2006.01)

(52) U.S. Cl.
CPC .............. *G01S 5/04* (2013.01); *G01S 5/0249* (2020.05); *H01Q 1/281* (2013.01); *G01S 2205/03* (2020.05)

(58) Field of Classification Search
CPC .......... G01S 5/04; G01S 5/0249; H01Q 1/281
USPC ....................................... 342/451
See application file for complete search history.

(56) References Cited

U.S. PATENT DOCUMENTS

| | | | |
|---|---|---|---|
| 4,108,400 | A | 8/1978 | Groutage |
| 6,268,822 | B1 | 7/2001 | Sanders |
| 2006/0158375 | A1 | 7/2006 | Macleod |
| 2007/0252748 | A1 | 11/2007 | Rees |
| 2009/0109085 | A1 | 4/2009 | Needham |
| 2013/0016011 | A1 | 1/2013 | Harriman |
| 2013/0207844 | A1 | 8/2013 | Lee |

(Continued)

FOREIGN PATENT DOCUMENTS

| | | | | |
|---|---|---|---|---|
| CN | 104698453 B | * | 4/2017 | ............. G01S 13/06 |
| CN | 109490969 A | * | 3/2019 | ............... G01V 3/12 |

(Continued)

OTHER PUBLICATIONS

Combined Search and Examination Report for Patent Appl. No. GB2004501.9 dated Sep. 16, 2020 8 pages.

(Continued)

*Primary Examiner* — Harry K Liu
(74) *Attorney, Agent, or Firm* — Maine Cernota & Curran (57) ABSTRACT

Disclosed herein A UAV and/or UAV operator detector (1) configured to be mounted to an aircraft (2). The detector comprises an array of multiple Directional Radio Frequency (RF) antennae spaced apart from one another over two or three dimensions.

20 Claims, 5 Drawing Sheets

(56) References Cited

U.S. PATENT DOCUMENTS

2015/0301154 A1* 10/2015 Fehling .................. H04B 7/086
                                                          342/368
2017/0192089 A1    7/2017 Parker
2019/0164442 A1    5/2019 Just
2019/0235047 A1*  8/2019 Hsiao ........................ G06T 7/70

FOREIGN PATENT DOCUMENTS

KR           101779900 B1      9/2017
WO      WO-0186319 A2 *  11/2001    ........... G01S 13/762
WO         2018183571 A1    10/2018

OTHER PUBLICATIONS

International Search Report and Written Opinion for PCT Appl. No. PCT/GB2021/050738 mail date Jun. 29, 2021, 15 pages.

* cited by examiner

UAV AND UAV OPERATOR DETECTOR

RELATED APPLICATIONS

This application is a national phase application filed under 35 USC § 371 of PCT Application No. PCT/GB2021/050738 with an International filing date of Mar. 25, 2021, which claims priority of GB Patent Application 2004501.9 filed on Mar. 27, 2020. Each of these is incorporated herein by reference in its entirety for all purposes.

FIELD OF THE INVENTION

The present invention relates to the detection of UAV's and/or their operators, in particular the detection of UAV's and/or their operators from an aircraft.

BACKGROUND TO THE INVENTION

Unmanned Aerial Vehicles (UAV's) are now integrating into modern society across the world. Otherwise known as Drones, they take on all shapes and sizes, some are inexpensive and easy to acquire. Whilst they will bring countless advantages to society, their increased usage within the airspace that is dominated by commercial and non-commercial aircraft presents an increased risk of collision or unsafe operations by said aircraft. Drones can also be easily adapted for malicious purposes. They can carry a broad range of payloads including contraband and explosives. So, their unrestricted or unlawful use is a constant concern for security operations.

Existing systems are in place around the world to counter the threat posed by uncontrolled drone usage. Such systems are based on detecting the communications between the operator and the drone. Apart from large UAV's, communications between a drone and its operator are usually based on Radio Frequency (RF) waves. Conventional systems can detect the RF transmissions thereby leading to detection of the drone as well as the operator. Using multiple antennae, it is possible to detect the position and direction of movement of the drone and therefore one can predict whether it presents a risk to any local air or surface contacts. Once the "threat" as it is known has been identified, then conventionally either a jamming signal can be implemented or there are various physical countermeasures that might be employed to take down the drone itself. These include capture nets, or specifically adapted munitions.

One of the problems with conventional drone detection systems is that they are not ubiquitous, in that they are only installed in areas where is it perceived to be the most risk, and they are land based. For example, they are often sited at airports, around military installations, and sports stadiums. Therefore, due to the finite power provided to such systems, their range is limited in these areas. For the safety of aircraft manoeuvring close to or within such areas the installation of these conventional detection systems is as a result sub optimal. This is because within the detection range afforded by the drone detection system any aircraft within that range is likely to be either within their landing or take off pattern. Whilst at such times the aircraft are at most risk, ironically, it is during these times that the aircraft, are less likely or are unable to deviate effectively if a threat is identified. Not only that, but a collision between the drone and the aircraft at these times would likely have greater consequences than a collision at altitude because the pilot would have less time to conduct a safe forced landing. Additionally, there are other times where aircraft are operating in an area which may not have a ground based Radio Frequency UAV detection system where the risk of collision with a UAV may occur.

There has now been devised a UAV detector which overcomes and/or mitigates the above referenced and/or other disadvantages associated with the prior art.

SUMMARY OF THE INVENTION

In an aspect of the invention there is provided a UAV and/or UAV operator detector as described in claim 1.

The UAV detector according to the invention is primarily beneficial because calculating the direction of the origin of the RF waves tells the user of the detector the position with respect to the aircraft of the UAV and/or its operator. Unlike ground based detection systems which cover a 360 degree azimuth coverage, the present invention takes into consideration that a UAV, which represents a threat of impact whilst the aircraft is airborne, would be within a limited forward sector both in azimuth and elevation from the aircraft's direction of travel. Having the boresights of the antennae pointed outwardly of an axis which is parallel to the longitudinal axis of the aircraft, the UAV detector therefore focusses its detection capability towards the front of the aircraft in both azimuth and elevation. In other words, the detector can detect a UAV and/or its operator to the left or right, or above or below the forward direction of the aircraft (depending on the mounting orientation of the antennae). In so doing the detector can detect RF waves originating from a UAV and/or its operator from any position in front of the aircraft. This enables the detector to determine the angle from the mounting position of the detector on the aircraft of the detected RF waves. Otherwise called the "angle of arrival" it provides an indication to the flight crew of the aircraft of the position of the UAV in relation to their flight. An aircraft at altitude is otherwise in danger of a drone being flown into its cockpit, breaching the cockpit window/s and seriously injuring flight crew. Therefore, the UAV detector facilitates warning of the threat and taking collision avoidance action.

Preferably the beam is focussed. By employing focussed antennae, the detection range is increased significantly over those antennae conventionally used which do not produce a focused beam. This is because directional antennae gain more sensitivity as their detection zone/beam becomes more focussed and forms a more concentrated detection pattern in front of them, otherwise known as a beam pattern. This therefore means that the detector can be used effectively in fast moving aircraft such as commercial and military jets.

The longitudinal axis of the aircraft is the central axis generally running through the length of the fuselage from the nose to the tail of the aircraft. In flight this longitudinal axis is more or less the same as the direction of flight, depending on the angle of attack of the aircraft, or indeed whether it is crabbing (i.e. heading and track not equal). The reference axis is an axis that lies between the antennae. Outwardly of a reference axis means away from the reference axis, or not parallel to the reference axis. Examples of suitable mounting positions for the detector include but are not limited to the nose, wing, fuselage roof, fuselage bottom or tail. The nose of the aircraft is the preferred mounting position, as this is the most forward part of the aircraft and gives the least restricted view for the antenna in front of the aircraft. It also means that the antennae are mounted forward of any material that may significantly change the free space gain performance in the antenna receiving cone.

It is preferred for the reference axis to be coaxial with the longitudinal axis of the aircraft. This enables accurate direction analysis in relation to the aircraft's heading. When not coaxial, for example if the detector is fitted to a left wing tip, a UAV very close in may be indicated to the right at close ranges and still hit the cockpit. However, in some instances fitting to a wing tip is more viable from an interference, ease of maintenance, or space perspective.

It will be understood that RF antennae are recognised devices to receive radio waves from a zone known as the beam. In the present invention the antenna are configured to receive RF waves from in front of the aircraft by the boresights of the antennae pointed outwardly of a reference axis which is parallel to the longitudinal axis of the aircraft. Due to the use of different types of antenna, the shape of the beam may vary, so any reference to a cone beam antenna means that the shape of the beam is generally conical. This surprisingly provides the best range and broadest power for the detection of the UAV forward of the aircraft. With regards the type of antenna, preferably one or more of the antennae within the array is a flat spiral antenna or horn antenna. This takes up the least space and can be configured the most accurately, whilst still providing a conical beam sensitivity range. Other examples of suitable types of antenna include but are not limited to Flat plate Linear antenna, Yagi antenna, Logperiodic antenna, Dish/Reflector (Parabolic) antenna, Corner Reflector antenna or Helical antenna. A directional antenna is an antenna which radiates or receives greater power in specific directions allowing increased performance and reduced interference from unwanted sources. In the present invention each antenna within the array may described as projecting its respective RF beam forwardly of the aircraft. This does not mean that the antenna is functioning as a transmitter and actually transmitting a RF wave from itself. It is simply used to describe how each antenna within the array is configured to receive RF waves from in front of the aircraft.

Due to RF attenuation in the antenna cables unless matched amplifiers are used preferably the distance between each of the antenna within the array is less than 3 m to reduce attenuation.

Preferably each of the antennae receives RF waves from within a beam which overlaps with the beam of its nearest neighbour. This has the benefit that there are no gaps in the detection area for UAV's to escape through around the reference axis or forward of the aircraft. It also means that the power of the antennae is maintained over a broader area in a more consistent manner. A non-limiting example of how this might be achieved is to mount each of the antennae at angles with respect to the aircraft. Alternatively, the signal into each antenna may each be guided or attenuated in specific directions by the addition of wave guides to the antennae. Preferably the boresights of the antennae form an angle with respect to the reference axis of between 10 and 45 degrees. This gives the potential for the antennae to detect RF waves from within an arc of up to 180 degrees forward of the position of mounting of the detector on the aircraft. This gives the detector the widest possible detection scope and also means that RF waves can be detected whilst the aircraft is turning, or crabbing, or elsewhere where the heading is not equal to the track of the aircraft. More preferably the boresights of the antennae form an angle with respect to the reference axis of between 20 and 30 degrees. This enables the detector to focus the area of detection towards to the forward parts of the aircraft more effectively and with greater range and accuracy.

The antennae will have the highest gain achievable whilst maintaining the directional spread to match the angular detection performance. Preferably one or more of the antennae has a gain of 3 dB or greater. This achieves the required detection distance. Preferably one or more of the antennae has up to a 90 degree beam width. More preferably the beam width of one or more of the antennae is up to 60 degrees. Even more preferably the beam width of one of more of the antennae is up to 45 degrees. This provides the necessary focus for the antenna and range, to make the detector suitable for use on fast moving aircraft. Preferably each of the antenna within the array is a wide band antenna to allow detection of UAV's in the most common UAV operating RF bands.

The receiver is preferably a software defined radio or multi/multiple band radio.

The RIC is preferably a field gate programmable array or solid state controller.

Examples of suitable processors include Intel® or AMD® type processors.

Each of the receiver, RIC and processor may share a number of functions. For example, and not limited therein, the receiver may perform the function of the receiver and the RIC or the processor may perform the function of the processor and the RIC, or the receiver may perform the function of the receiver, the RIC and the processor. In order to achieve this, each of the receiver, RIC and processor may be configured with any of a receiver, RIC and processor.

Preferably upon instruction from the RIC, the processor activates and deactivates each of the antennae within the array to receive the RF waves in a sequential fashion. That is to say the antenna are switched on and off sequentially, in order to receive RF waves in a sequential manner. This enables the detector to build up a picture of the direction the UAV is flying at (i.e. its track) in relation to the detector on the aircraft. Sequentially can mean that every antenna is operated at the same time in one instance and then again at a second instance and repeatedly thereafter many times a second. Sequentially can also mean that consecutive antenna are operated one after another in one event, and then again at a second event and repeatedly thereafter many times a second. Operation of the antenna within the context of the present invention means to switch it on or switch it off. Preferably from one sequence to the next the RIC compares the respective amplitudes and the processor further calculates the direction the UAV is flying at with respect to the aircraft from said comparison.

Preferably, within each sequence, multiple frequency ranges are scanned, and the processor is configured to compare the detected RF wave amplitude and frequency with a database of known frequencies for known UAV's to provide an approximate range and identity of the UAV detected. Typical frequencies scanned through are 433 MHz, 868 MHz, 900 MHz, 1200 MHz, 2.4-2.5 GHz and 5.7-5.8 GHz.

The detector is advantageously and surprisingly beneficial at measuring azimuth angle of the RF wave source. That is to say the angle of arrival of the UAV and/or its operator. Preferably though there are one or more further conical beam Directional Radio Frequency (RF) antennae within the array. This has been surprisingly found to enable the user to identify elevation angle as well as azimuth angle. So, the user can tell more accurately where the UAV and/or its operator is with respect to the aircraft. The one or more further antennae are preferably mounted to the array so that each antenna is separated from its nearest neighbour equidistantly. For example, if there are three antennae then they are mounted in a triangular configuration on the array. However, in some instances it may be necessary to configure the antennae positions in the array in a predetermined manner depending on the area of target detection to be focussed on and/or to improve detection signal. This enables the user of the detector to have increased confidence in the UAV or UAV operator position with respect to the aircraft. For example, if there are five antennae then they are mounted in a crossover configuration in the array, like the arrangements seen in a playing dice. One of the one or more further antenna may be mounted with its boresight coaxial with the reference axis. This allows for multiple antennae to be used in the detector to best achieve the angular sighting measurement. Within the context of the invention adjacent means in the immediate close proximity, for example abutting one another or within up to 5 metres of one another. Adjacent does not mean that the antennae are mounted to separate parts of the aircraft, such as to either wing, or to the nose and the wing. Therefore, the detector according to the invention is a single unit rather than having modules dispersed throughout the aircraft in use.

In another aspect of the invention there is provided a method for detecting a UAV and/or its operator, the method comprising the steps of
 a) mounting a detector substantially as described above about to an aircraft,
 b) demodulating any modulated RF waves received from the antennae,
 c) measuring the amplitude of the demodulated waves, and
 d) calculating the position of the origin of the RF waves with respect to the detector from the amplitude data from the RIC.

The method of the invention is advantageous as it enables indication to a flight deck crew indicating a simple, but effective, understanding of a UAV in relation to its flight path by providing a simple, "left", "right" or "on track", as well as "higher", "lower" or "same level" indication, thereby enabling situational awareness and details of position in order to allow for avoidance action, if required.

The method may further comprise the step of activating and deactivating each of the antennae within the array to receive the RF waves in a sequential fashion and from one sequence to the next comparing the respective amplitudes, the processor further calculating the direction the UAV is flying at with respect to the aircraft from said comparison.

The method may further comprise the step of scanning multiple frequency ranges within each sequence, the processor being configured to compare the detected RF wave amplitude and frequency with a database of known frequencies for known UAV's to provide an approximate range and identity of the UAV detected.

The invention will now be described by way of example only with reference to the figures in which like numerals represent like parts.

DETAILED DESCRIPTION OF THE ILLUSTRATED EMBODIMENT

The following description presents exemplary embodiments and, together with the drawings, serves to explain principles of the invention. However, the scope of the invention is not intended to be limited to the precise details of the embodiments, since variations will be apparent to a skilled person and are deemed also to be covered by the description. Terms for components used herein should be given a broad interpretation that also encompasses equivalent functions and features. Descriptive terms should also be given the broadest possible interpretation; e.g. the term "comprising" as used in this specification means "consisting at least in part of" such that interpreting each statement in this specification that includes the term "comprising", features other than that or those prefaced by the term may also be present. Related terms such as "comprise" and "comprises" are to be interpreted in the same manner. Directional terms such as "vertical", "horizontal", "up", "down", "upper" and "lower" are used for convenience of explanation usually with reference to the illustrations and are not intended to be ultimately limiting if an equivalent function can be achieved with an alternative dimension and/or direction.

The description herein refers to embodiments with particular combinations of features, however, it is envisaged that further combinations and cross-combinations of compatible features between embodiments will be possible. Indeed, isolated features may function independently as an invention from other features and not necessarily require implementation as a complete combination.

Figure 1:
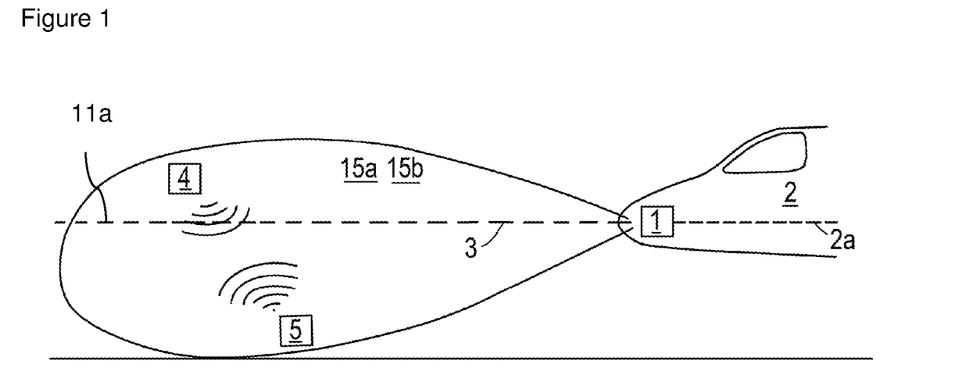
FIG. 1 shows a side view of an embodiment of the detector according to the invention mounted to an aircraft.

FIG. 1 shows a schematic representation of an embodiment of the detector according to the invention. The detector is generally designated 1 and is mounted within the nose cone of an aircraft 2. In the example the aircraft 2 is a jet airliner. In the flightpath 3 of the aircraft 2 there is a flying UAV 4, operated by an operator 5 who is on the ground.

The detector 1 comprises an array of two antennae 10a, 10b, (shown on FIG. 2) mounted side by side to the front of a flat metal plate support 11. The support 11 is rectangular but may be any other shape. The flat plate support 11 is mounted to aircraft within the nose case, at right angles to the central longitudinal axis of the aircraft. This central longitudinal axis is shown as the dotted line 2a in FIG. 1, and the spot 2a in FIG. 2 and coincides with the centre of geometry of the two antennae 10a, 10b.

Figure 2:
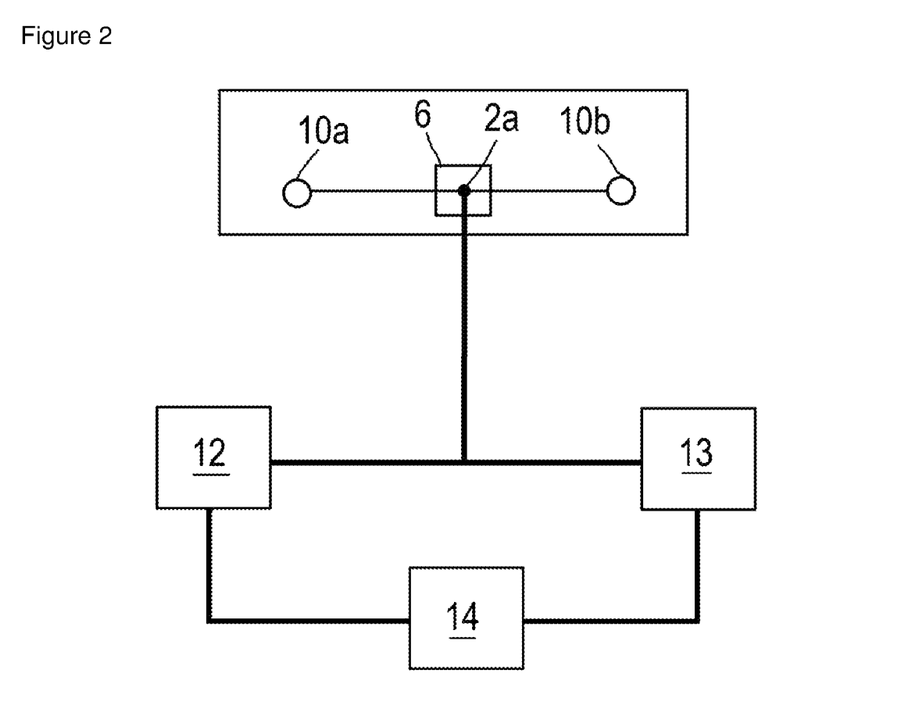
FIG. 2 shows a schematic representation of the detector as shown in FIG. 1.

The antennae 10a, 10b, are in electrical communication with one another through a switch 6, and with both a processor 12, a radio receiver 13 and a reprogrammable integrated circuit (RIC) 14. The switch 6 is able to turn on and off the respective antenna 10a, 10b.

Whilst shown separately the RIC 14 is actually built into the receiver 13. The RIC 14 is a field gate programmable array (FGPA) 14. The switch is a METIS MAL-RFS-8p-18G switch, the Receiver containing a field gate programmable array is the Nexus 100-18 and the Processor is an Airborne qualified Intel I7 based processor.

Figure 3A:
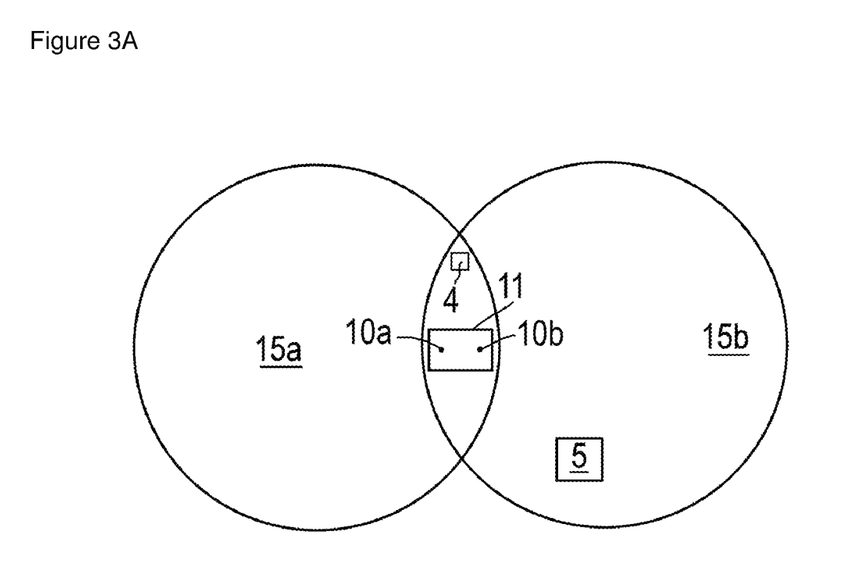
FIG. 3A shows the detector as shown in FIG. 1 but viewed from the front of the aircraft.
Figure 3B:
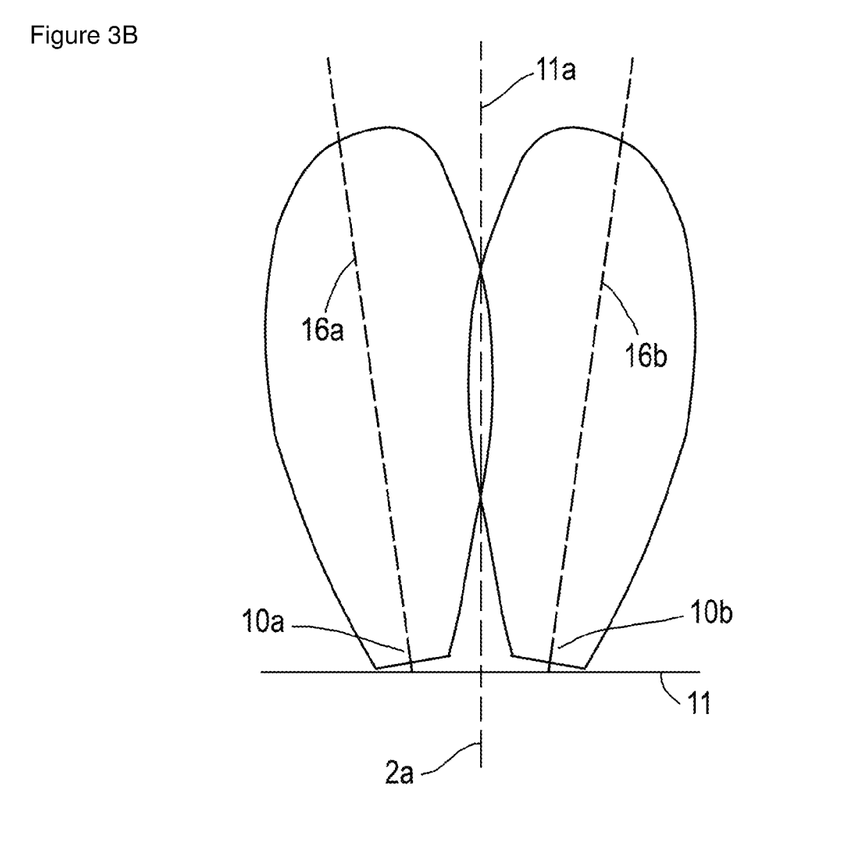
FIG. 3B shows the detector as shown in FIG. 1 but viewed from above.

Each of the antennae 10a, 10b are cone beam antennae providing a 60 degree 3 dB beam width. In other examples of the invention the detector 1 is substantially as described except that the antenna have a beam width of less or more than 60 degrees. The respective cones of detection 15a, 15b are shown in FIGS. 1 and 3 and extend forward of the nose of the aircraft 2. The antennae 10a, 10b are mounted angularly within the support 11 so that only a limited amount of the respective cones 15a, 15b overlap.

FIG. 3A shows a view from the front of the aircraft 2 and details the approximately round cone beams of the antenna 15a and 15b. FIG. 3B shows the effect of the angular mounting of the two antenna 15a and 15b. The mounting plate 11 is shown which mounted at right angles to the longitudinal axis if the aircraft 2a. The plate is mounted centrally of this axis and the antenna 15a, 15 are mounted equidistant either side of a reference axis 11a extends centrally from the plate 11 at right angles to the plate 11. In this example as the plate 11 is centrally located to the longitudinal axis 2a, the longitudinal axis 2a and the reference axis 11a of the antennae 15a, 15b are coaxial. In other examples however, where the plate carrying the antenna is mounted to say a wing or the tail of the aircraft then the reference axis 11a is not coaxial with the axis 2a of the aircraft. The antenna 15a has a boresight 16a which extends in a direction that is 25 degrees off set from the reference axis 11a. The antenna 15b has a boresight 16b which extends in a direction that is 25 degrees off set from the reference axis 11a, but in the opposite direction to that of the boresight 16a of antenna 15a. The reference axis 11a and the flight path 3 are generally coaxial also as the aircraft in this example is in cruise level flight.

In use, the RIC 14 commands the processor 12 to activate the switch 6 to turn on each of the antenna 10a, 10b. Whilst the antennae 15a, 15b are on, the radio receiver 13 picks up via the antennae 10a, 10b any RF radio waves in front of the aircraft 2 and within the general region of the detection cones 15a, 15b. In this case the receiver will pick up the RF Waves originating from the UAV 4 and from the operator 5. It will be appreciated that the cones of detection 15a, 15b do not have defined boundaries as shown in the figures, but the cones shown merely serve to indicate the areas where the greatest power of each antenna extends to. The receiver 13 then performs fast Fourier signal analysis on the signal detected and also demodulation before communicating the output to the RIC 14. The RIC 14 then performs further demodulation of the signal in order that the signal may be displayed coherently on a signal analyser window (not shown) via the processor which is a graphical display for the user to observe the signal if required.

During this time, the radio frequency that the receiver 13 receives a signal at is further cycled through 433 MHz, 868 MHz, 900 MHz, 1200 MHz, 2.4-2.5 GHz and 5.7-5.8 GHz. These are the common operating frequency bands for most known UAV's. Data is collected on the amplitude of each RF wave signal at each respective frequency on each antenna.

The detector 1 is able to calculate the position of the UAV 4 and its operator 5 with respect to the aircraft 2. For position or the origin of the RF waves, if a UAV or operator is present (i.e. if radio waves are present), by measuring and comparing the amplitude of the RF waves received between each antenna 10a, 10b from their respective cone beams 15a, 15b, the RIC 14 in conjunction with the processor detects the directional position of the UAV or its operator in relation to the aircraft detector. In the example shown in FIGS. 1 and 3, the UAV 4 is immediately above the flight path 3, but sufficiently close to the flight path for it to be a danger to the aircraft 2. The operator 5 is on the ground so well below the flight path, but to the right of the flight path as viewed from the front of the aircraft 2. The UAV is positioned wholly within beam 15a and 15b. The amplitude of the signals picked up by antennae 10a and 10b of UAV 4, is therefore the same or very similar. If the UAV 4 was alternatively positioned either to the left or to the right of the flight path, then there would be increases in the signal amplitude from antenna 10a or antenna 10b respectively. The RIC 14 measures the amplitude of each RF wave signal, passes the data to the processor 12 which then calculates the position of the UAV 4 from the data, by performing vector sum calculations and covariance calculations on the data from each antenna signal. It is also possible for the RIC 14 to carry out the calculations, in order to reduce the workload on the processor 12.

For the position of the operator the RIC 14 and processor 12 conduct similar measurements and calculations, respectively and compares the data on signal amplitude information between the antenna 10a and 10b. In this case, the operator 5 is within beam 15b, and not at all within beam 15a. Furthermore, the signal is derived from a position at the edge of the cone beam of each antenna. Therefore the antenna 10b will produce a signal with a higher amplitude, than the signal derived from antenna 10a but localising the original of the RF waves to the operator on the ground is harder as having just two antennae does not provide any elevation data to the processor.

Figure 4:
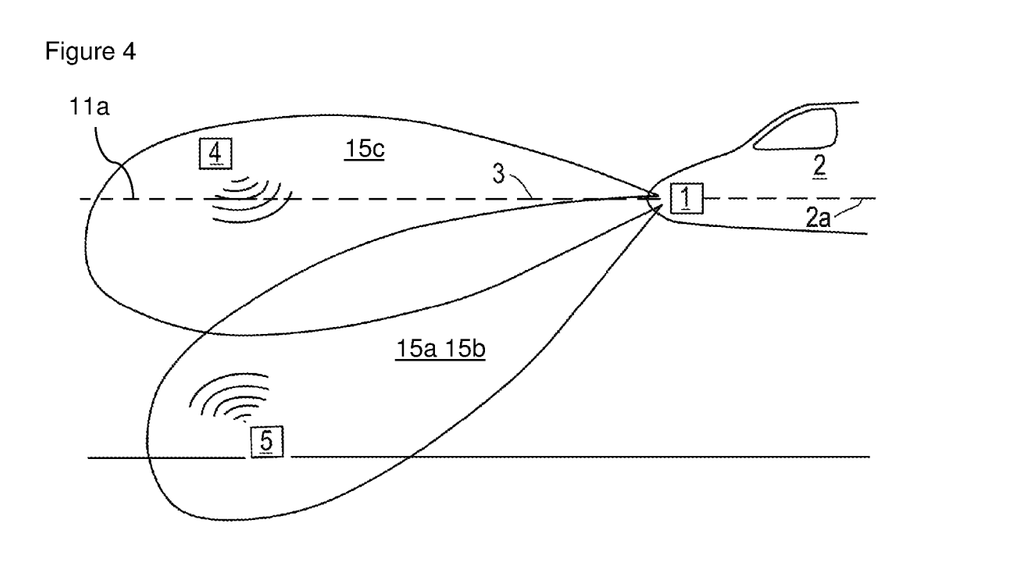
FIG. 4 shows a second embodiment of the detector comprising three antennae.
Figure 5:
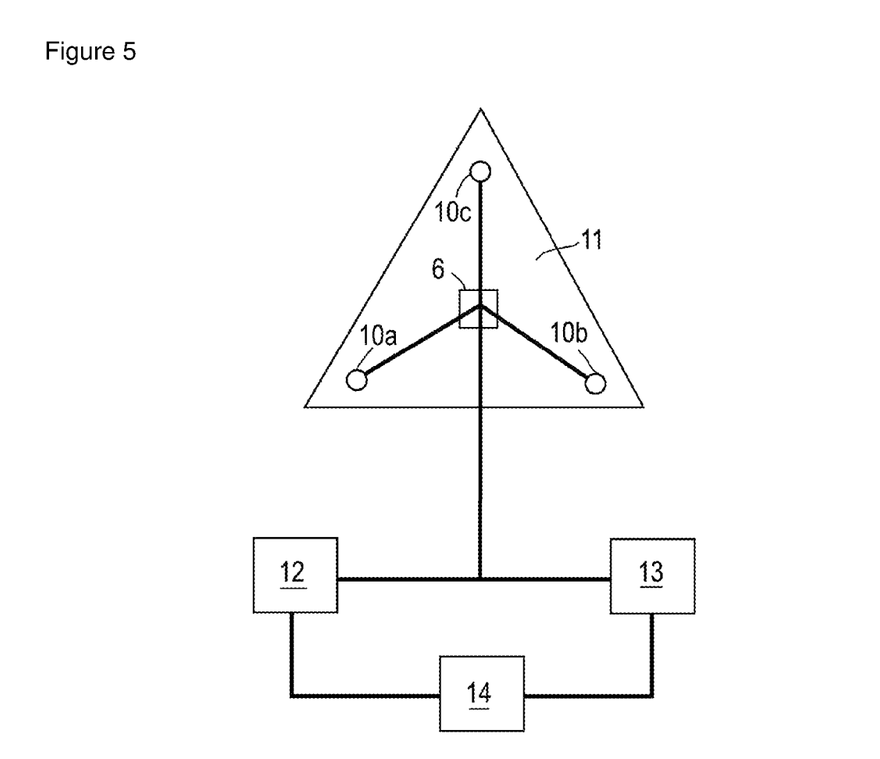
FIG. 5 shows a schematic representation of the detector shown in FIG. 4.
Figure 6A:
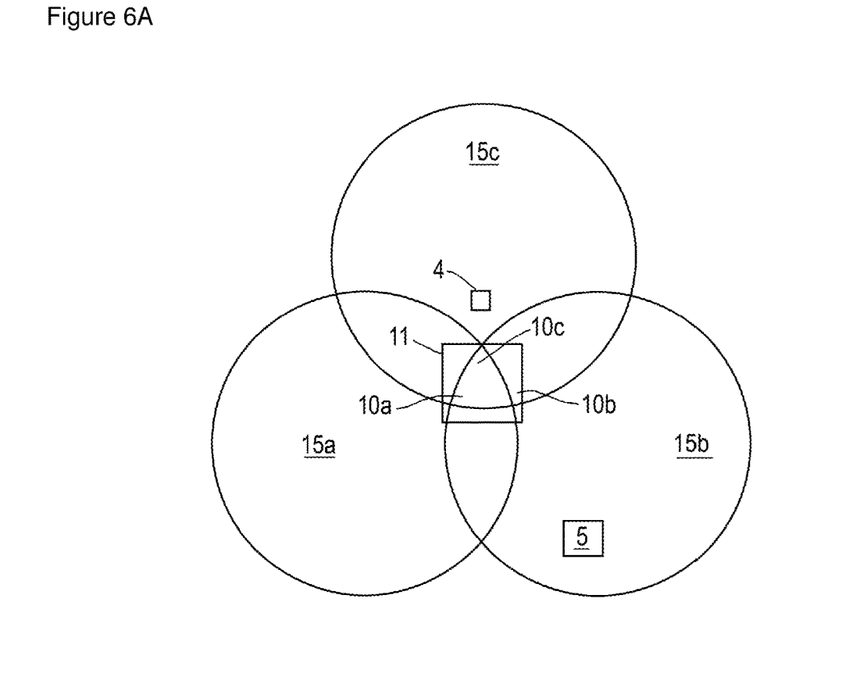
FIG. 6A shows the detector as shown in FIG. 4, but viewed from the front of the aircraft.
Figure 6B:
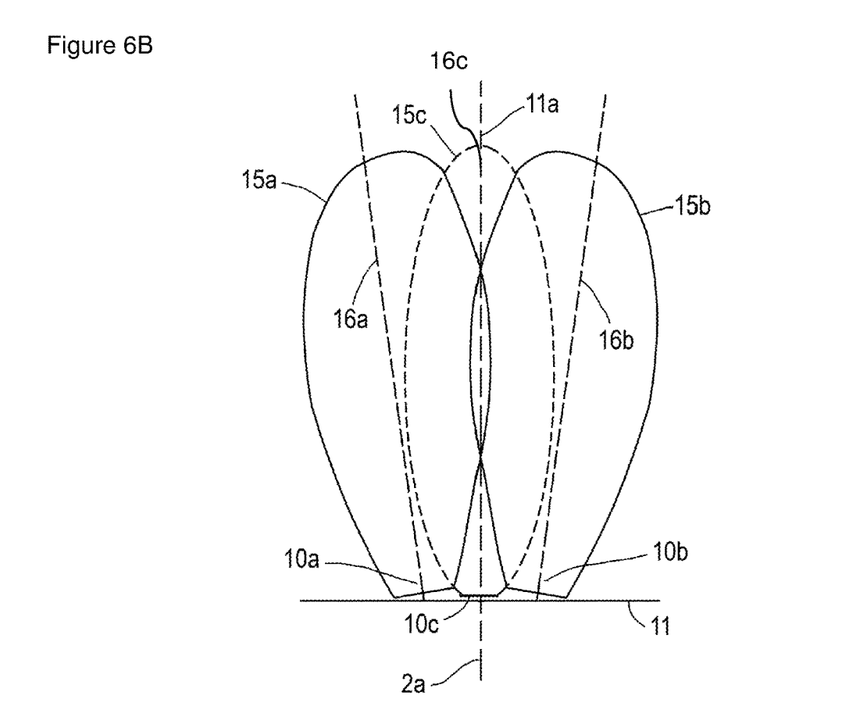
FIG. 6B shows the detector as shown in FIG. 4 but viewed from above.

To calculate elevation a third or more antennae are required. Therefore, in another example of the detector 1, shown in FIGS. 4, 5 and 6, the detector 1 is substantially as described above but there are three antenna 10a, 10b and 10c instead of two. Each has a cone beam 15a, 15b, 15c as described above, but are arranged on the triangular plate 11 in a triangular configuration. The connections to each of the antenna are as described above and the angular mounting is as described above with each antenna 10a, 10b, 10c having a boresight 16a, 16b, 16c which is pointed 25 degrees away from the reference axis 11a. In this example the RF waves originating from the UAV 4 appear wholly within the beam 15c, but because of the presence of the other two beams 15a and 15b at a lower elevation and the amplitude measured from those antenna being considerably less, the processor calculates not only the azimuth angle from the aircraft but also the elevation, so the user can identify that the UAV is slightly above the flightpath of the aircraft. The same is true for the RF waves from the operator 5 on the ground. The RF wave amplitude detected by antenna 10b is the greatest, then followed by antenna 15a, then finally with a negligible signal detected by antenna 10a. The processor calculates from the amplitude date that the signal is derived from a source on the ground, and the user is informed as such.

In another example of the invention the detector 1 is substantially as described above but is able to calculate the direction the UAV is flying at in relation to the aircraft detector 1. In use the RIC 14 commands the processor 12 to activate the switch 6 to turn on and then off each antenna 10a, 10b and 10c in a sequential fashion. In other words, the RIC 14 commands the processor 12 to switch on the antenna 10 for a period, and then switch it off again. The RIC 14 then commands the processor 12 to switch on the antenna 10b for a period and then switch it off again. The same then happens for the antenna 10c in the embodiment where there is a third antenna. The period whilst each of the antenna 10a, 10b and 10c, is on for is approximately 100 nano seconds. During each of these periods the radio received 13 picks up via the antennae any RF radio wave in front of the aircraft 2 and within the general region of the detection cones 15a, 15b and 15c (if a third antenna is present). Once the RIC has completed the first sequence of switching through antennae 10a, 10b, 10c, it conducts a second and further rounds and keeps cycling through the sequence until instructed otherwise by the user. From one RIC 14 commanded sequence to the next, the RIC 14 compares the respective amplitudes from each of the antenna via the receiver 13 and the processor further calculates the direction the UAV 4 is flying at in relation to the aircraft detector 1 or the operator 5 with respect to the aircraft 2 from said comparison. This process is completed over and over again to build up a picture of the direction the UAV 4 is travelling in.

In another example of the detector 1 there is a detector 1 substantially as described above but one which is able to calculate the range of the UAV 4 and/or the operator 5 from the aircraft 2. Within each cycle, multiple frequency ranges are scanned. UAV's are known to operate on particular frequency bands and emit RF waves of a particular strength. Thus, the overall amplitude of the signal within such bands gives an indication as to the range the UAV is from the detector 1. Taken collectively the larger the amplitudes calculated the closer the UAV and/or its operator is. This is otherwise called power on arrival. I.e. power of the signal on arrival to the detector 1. To achieve this the processor 12 compares the detected signal frequency with a database of known frequencies and their emitted radiation power (EIRP) for known UAV's. If a match is found it provides an identification of the UAV 4 and/or its operator 5 and their approximate range from the detector 1.

Figure 7:
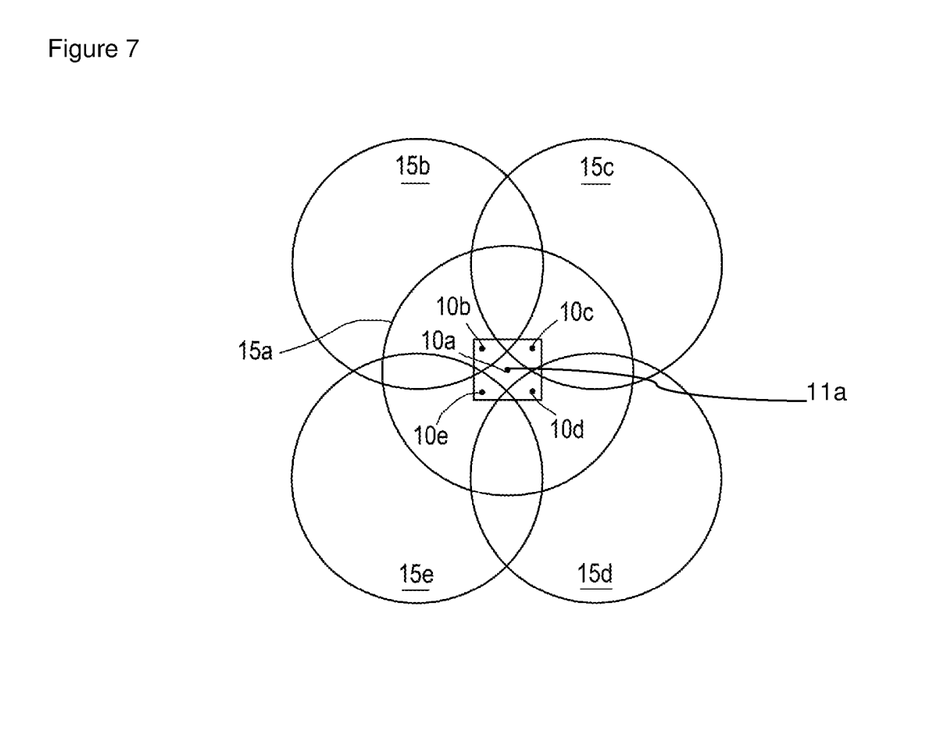
FIG. 7 shows a third embodiment of the detector comprising five antennae.

In another example, there is a detector 1 substantially as described above, but instead of two or three antennae there are five antennae, distributed in a crossover array with a single central antenna. This example is shown in FIG. 7. The support 11 holds the 5 antennae 10a, 10b, 10c, 10d and 10e. Antenna 10a is in the centre of the support 11 and points directly down the aircraft's flight path 3, with a boresight coaxial with the reference axis 11a. The remaining antennae 10b, 10c, 10d, 10e are distributed at the corners of a square that has its centre where the antenna 10a is located. The remaining antennae 10b, 10c, 10d, 10e are all mounted so their boresights point outwardly of the reference axis 11a, as is described above. Therefore, if a UAV is present exactly on the flight path this example of detector 1 will provide a much stronger signal than the signal provided by that shown in FIGS. 4 to 6, in particular areas in front of the aircraft 2.

In other example the detector 1 is substantially as described above but some or all of the antennas have the same overall angular detection limits, but the antennae use narrower cone beams at a higher gain. For example, the central antenna 10a may be higher power than the antenna 10b, 10c, 10d or 10e. This increases the detection range from the aircraft within the central region in front of the aircraft and is particularly suited for fast moving jets.

It will be appreciated that the invention is not limited to detectors 1 having two, three or five antennae, or the distribution of the antennae on the support, or their angular displacement. Many numbers of antennae may be incorporated, at different angles and in varied distribution patterns in order to achieve the performance required.

What is claimed is:

1. A UAV and/or UAV operator detector suitable for mounting to an aircraft;
the detector comprising:
an array of two conical beam Directional Radio Frequency (RF) antennae;
a radio receiver;
a reprogrammable integrated circuit (RIC); and
a processor;
the antennae, radio receiver, RIC and processor all being in electrical communication with one another;
wherein in use, the detector is mounted to an aircraft with the antennae mounted adjacent one another about a reference axis which is parallel to the longitudinal axis of the aircraft and with the boresights of the antennae pointed outwardly of the reference axis in opposite directions to one another;
the receiver demodulating any modulated RF waves received from the antennae;
the RIC measuring the amplitude of the demodulated waves;
the processor calculating the position of the origin of the RF waves with respect to the detector from the amplitude data from the RIC.

2. The detector according to claim 1, wherein the beam is focussed.

3. The detector according to claim 1, wherein one or more of the antennae within the array is a flat spiral antenna or horn antenna.

4. The detector according to claim 1, wherein the distance between each of the antenna within the array is less than 3 m.

5. The detector according to claim 1, wherein each of the antennae receives RF waves from within a beam which overlaps with the beam of its nearest neighbour.

6. The detector according to claim 1, wherein the boresights of the antennae form an angle with respect to the reference axis of between 10 and 45 degrees.

7. The detector according to claim 1, wherein one or more of the antennae has a gain of 3 dB or greater.

8. The detector according to claim 1, wherein one or more of the antennae has up to a 90 degree beam width.

9. The detector according to claim 1, wherein each of the antenna within the array is a wide band antenna.

10. The detector according to claim 1, wherein the detector is mounted on or within the nose of the aircraft.

11. The detector according to claim 1, wherein the reference axis is coaxial with the longitudinal axis of the aircraft.

12. The detector according to claim 1, wherein the receiver is a software defined radio or multi/multiple band radio.

13. The detector according to claim 1, wherein the RIC is a field gate programmable array or solid state controller.

14. The detector according to claim 1, wherein upon instruction from the RIC, the processor activates and deactivates each of the antennae within the array to receive the RF waves in a sequential fashion.

15. The detector according to claim 1, wherein there are one or more further conical beam Directional Radio Frequency (RF) antennae within the array.

16. The detector according to claim 1, wherein there are one or more further conical beam Directional Radio Frequency (RF) antennae within the array and wherein one of the one or more further antennae is mounted with its boresight coaxial with the reference axis.

17. An aircraft having mounted thereon or therein a detector according to claim 1.

18. A method for detecting a UAV and/or its operator, the method comprising the steps of:
a) mounting a detector comprising an array of two conical beam Directional Radio Frequency (RF) antennae to an air-craft, the detector mounted to the aircraft with the antennae mounted adjacent one another about a reference axis which is parallel to the longitudinal axis of the aircraft and with the boresights of the antennae pointed outwardly of the reference axis in opposite directions to one another;

b) demodulating any modulated RF waves received from the antennae;

c) measuring the amplitude of the demodulated waves; and d) calculating the position of the origin of the RF waves with respect to the detector from the amplitude data from the RIC.

19. The method according to claim 18, further comprising:

a step of activating and deactivating each of the antennae within the array to receive the RF waves in a sequential fashion and from one sequence to the next comparing the respective amplitudes;

the processor further calculating the direction the UAV is flying with respect to the aircraft from said comparison.

20. The method according to claim 18, further comprising:

a step of scanning multiple frequency ranges within each sequence, the processor being configured to compare the detected RF wave amplitude and frequency with a database of known frequencies for known UAVs to provide an approximate range and identity of the UAV detected.

* * * * *